March 10, 1959   J. A. ROWLEY ET AL   2,877,312
TROLLEY COLLECTOR
Original Filed March 18, 1949   3 Sheets-Sheet 1
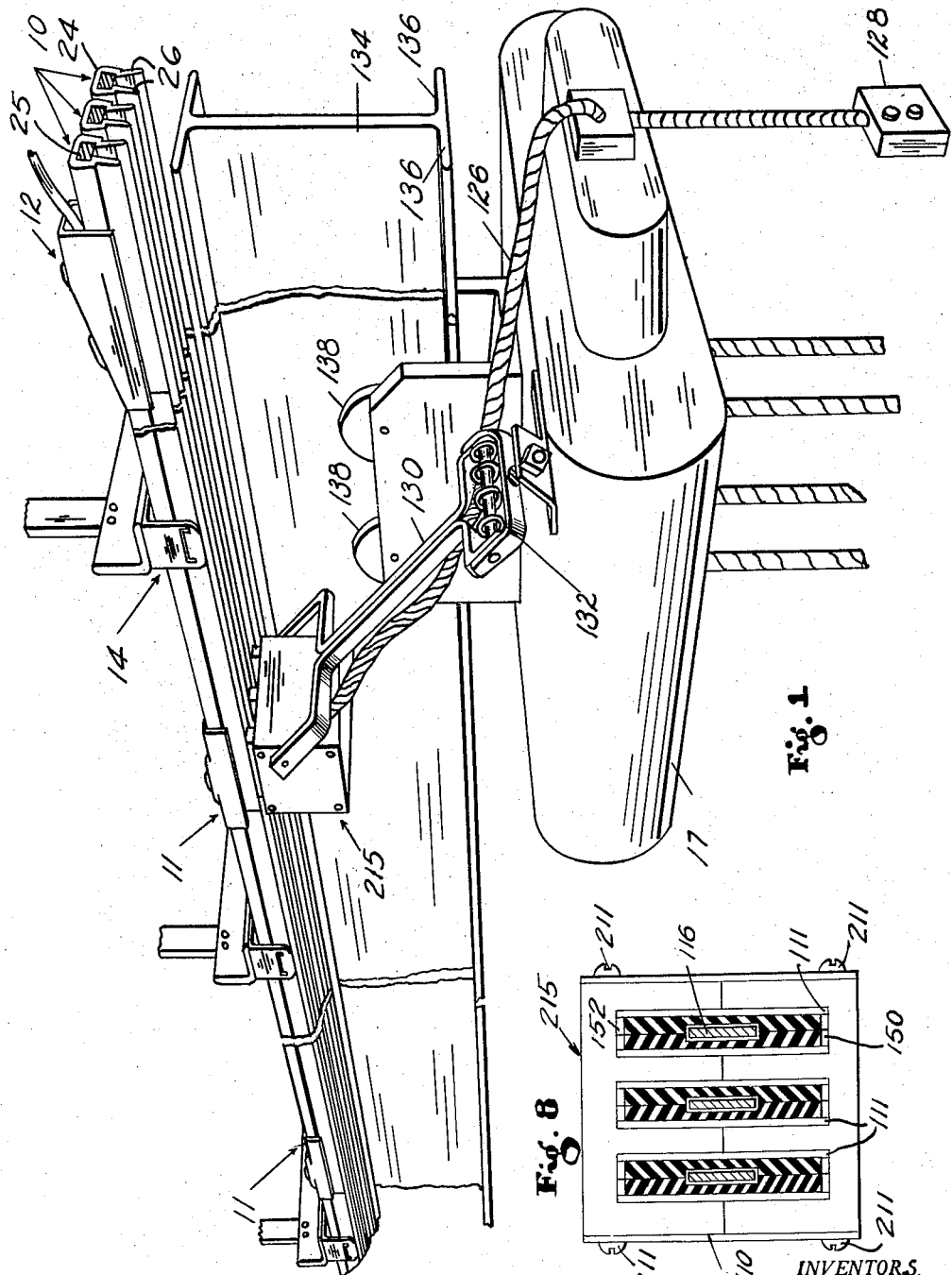
INVENTORS.
James A. Rowley
BY Joseph A. Murphy
Daniel G. Cullen
attorney

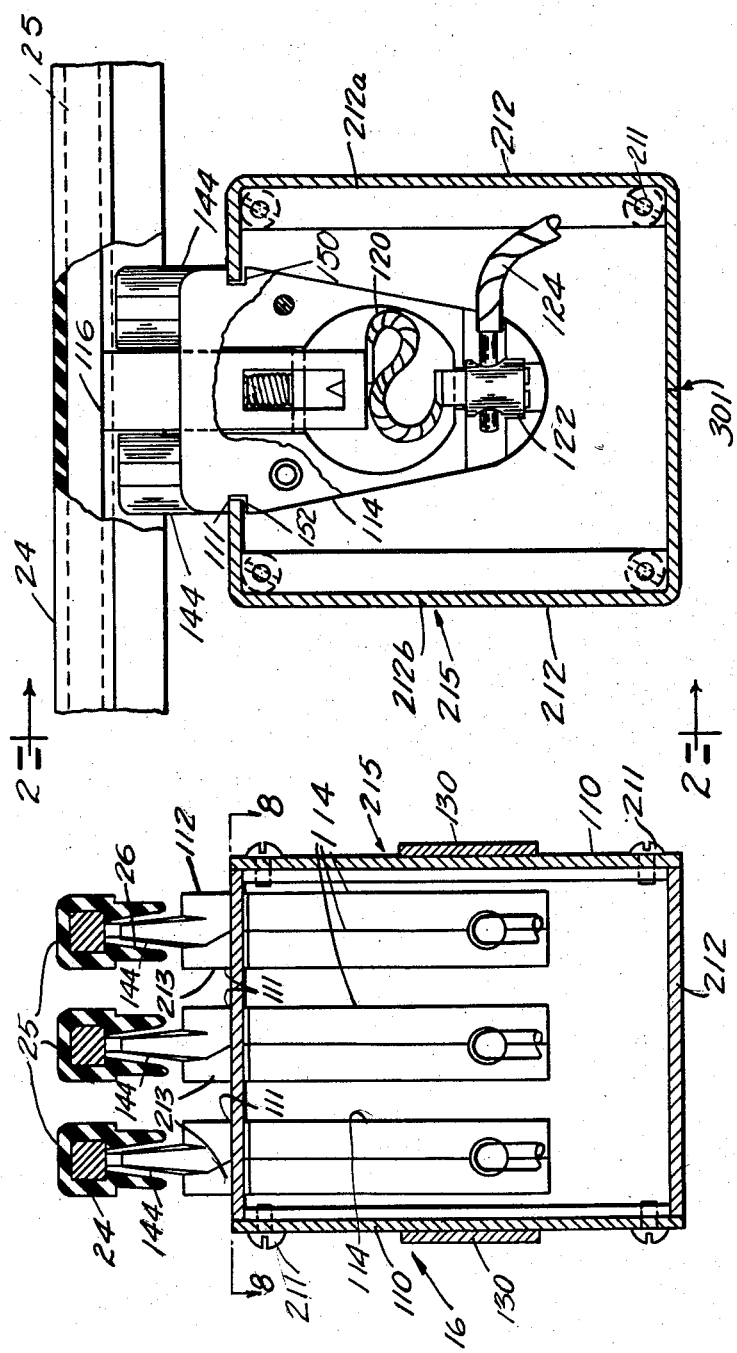

March 10, 1959     J. A. ROWLEY ET AL     2,877,312
TROLLEY COLLECTOR

Original Filed March 18, 1949     3 Sheets-Sheet 3

INVENTORS.
James A. Rowley
BY Joseph A. Messing
Daniel G. Cullen
Attorney

United States Patent Office 2,877,312
Patented Mar. 10, 1959

2,877,312

TROLLEY COLLECTOR

James A. Rowley, Emmetsburg, Iowa, and Joseph A. Messing, Detroit, Mich., assignors, by mesne assignments, to I-T-E Circuit Breaker Company, Philadelphia, Pa., a corporation of Pennsylvania Original application March 18, 1949, Serial No. 82,078. Divided and this application January 21, 1953, Serial No. 332,404

3 Claims. (Cl. 191—59.1)

This invention relates to trolley type electric collectors for use with an electric current distribution system. This application is a division of co-pending application Serial No. 82,078, filed March 18, 1949, now abandoned, and assigned to the assignee of the present invention. Multiphase electric current distribution systems used to supply such trolley collectors consist of a number, generally, of conductors normally one per phase, partially enclosed in a duct or housing which supports and protects the conductors. Such systems are often employed to supply electric current through movable collectors to traveling cranes or hoists. In such installations quite often the individual conductors become misaligned. Also, the duct openings which permit access to the conductors and in which the collectors operate accumulate foreign matter, especially in industrial atmospheres, thus preventing free movement of the collector or of the collector contactors. Such distortions of the conductors or impediments in the duct result in costly delays and electrical damage to expensive machinery. It is, therefore, a principal object of this invention to provide a trolley collector which is not readily impeded in its passage along the electric current transmission system by misalignment or distortion of said system.

Another principal object is to provide a trolley collector which is not readily barred from passage along the electric current transmission system by impediments or foreign matter in the openings of said system.

Another object is to provide a trolley collector as part of an electric current transmission system which will maintain electric contact with said system even though the system becomes misaligned or the conductor enclosure openings corroded.

Another object is to provide compensation for movement of the trolley collector.

Still another object is to provide a trolley which is flexible and easily maintained and repaired.

Still other objects will appear from the following description and drawings in which:

Fig. 1 is a perspective view of an electric current distribution system employing the invention.

Fig. 2 is a cross sectional view of the trolley looking in the direction of arrows 2 of Fig. 3.

Fig. 3 is a cross sectional side view of the trolley collector showing a portion of the collector head casing cut away.

Fig. 8 is a section through line 8—8 of Fig. 2 looking in the direction of arrows 8—8.

Figures 4, 5:
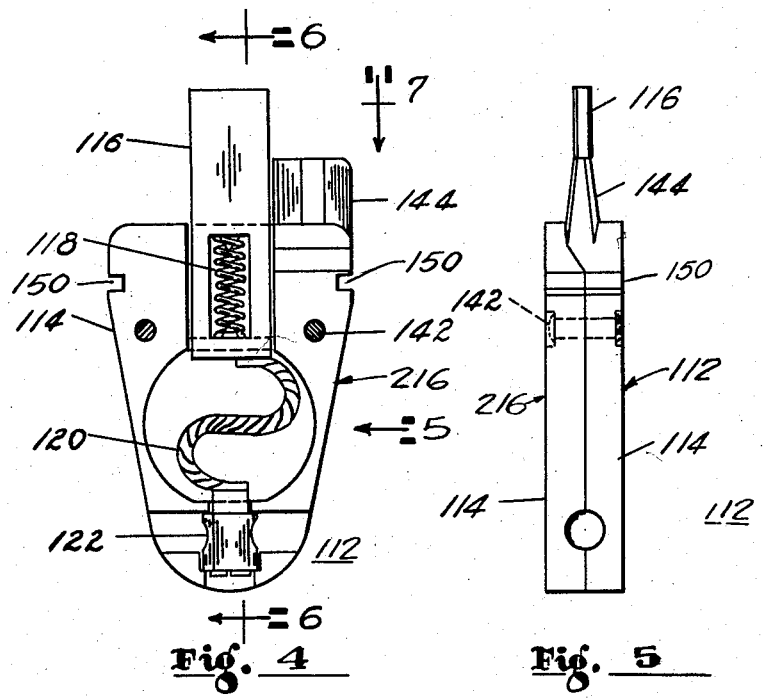
Fig. 4 is a side view of a collector head with one half of the casing removed.
Fig. 5 is a front view of a collector head.

Referring to the drawings, Fig. 1 shows, as disclosed in the abandoned application referred to above, a multiphase electric distribution system consisting of three unit lengths of a distribution duct 10 arranged in parallel relationship and secured together by supports 14. Each of the ducts 10 consists of a bus bar 25 of suitable conductive metal, such as copper, an insulating duct 24 having a depending portion 26 extending below the undersurface of the bus bar 25 on each side for guiding and insulating the collector head elements of the trolley collector hereinafter described.

Appropriate duct section junctions and electric current feed-in means are provided at 11 and 12, respectively.

Arranged below the distribution ducts 10 with its contactor elements 116 engaged with the undersurface of the bus bars 24 is a trolley collector denoted generally as 16. This trolley collector is shown mechanically secured and electrically connected to a crane unit 17 which is suspended from a track 134 by rollers 138.

The trolley collector unit 16 (Fig. 2) is comprised of a sheet metal housing 215 having incorporated therein three (as shown in Fig. 2) collector heads 112 having portions which extend through openings 111 in the top wall of housing 215. The body portion 212 is comprised of two symmetrical half sections 212a and 212b which, as illustrated in Figure 3, meet along the line 301 at the bottom thereof, and, as illustrated in Figure 8, meet along the line 302 at the top thereof. By constructing the housing in two half sections the collector heads 112 can be positioned and held due to the engagement of the half sections 212a and 212b in the slots 150 and 152 respectively. This housing 215 has side plates 110 removably secured to the body portion 212 as by screws 211 to permit access for the repair or replacement of collector heads 112.

Figures 6, 7:
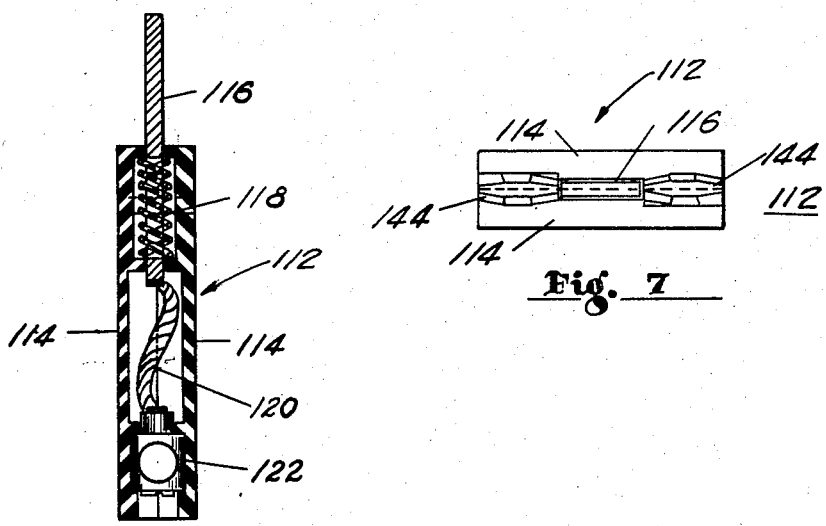
Fig. 6 is a cross sectional view as if on line 6—6 of Fig. 4.
Fig. 7 is a top plan view of a collector head.

Each collector head 112 (Figs. 4, 5, 6) is comprised of a casing 216 of insulating material which consists of two identical halves 114. Each half extends above the body of the collector head casing to form a guide lug 144 which rides in and is guided by the depending portions 26 of insulating ducts 24 (Figs. 1, 2, 3) when the trolley collector is positioned in the distribution system. These guide lugs 144 are of tapered semielliptical shape (Fig. 7) to permit easy installation into the distribution system and to enable them to move freely in either direction within the duct openings when such duct openings are corroded by deposits of foreign matter. Contained within a recess formed by cutting away portions of the halves 114 of the collector head casing 216 (Fig. 4) is a contactor 116 biased upwardly by a spring 118 which has its lower end seated on a portion of the casing as shown in Fig. 6. The lower end of this blade 116 is connected by a flexible conductor 120 to a connector 122. This connector receives the end of a load conductor 124 as shown in Fig. 3. The three load conductors which lead from the three collector heads 112 in the trolley collector 16 are combined into a cable which carries electric current to the using apparatus, such as the hoist apparatus shown in Fig. 1. Each collector head casing 216 is provided with notches 150 and 152 that mate with the edges or projections that form upper wall openings 111, to enable it to be secured in the upper wall openings 111 of housing 215 (Fig. 3). These three openings 111 are wider than the collector head casings 216 (Fig. 8) and large enough to permit lateral shifting of the collector heads 112, thus insuring additional flexibility as the trolley collector moves along the distribution system.

The trolley collector 16 is disposed beneath the distribution system as shown in Fig. 1, with the upper surface of the contactors 116 abutting the lower surface of conductors 25 and resiliently held there by springs 118. Guide lugs 144 are positioned in the depending portions 26 of the ducts 10. The collector 16 is held in place in the distribution system by a pivotal connection with a supporting arm 130 (Fig. 1) which is biased upwardly by torsion springs 132 secured to the hoist structure 17 to permit rotation of supporting arm 130. The collector can then move in either direction along the duct with equal ease. The freely mounted collector heads 112 maintain electrical contact and the guide lugs 144 both guide the collector heads 112 and remove impediments and foreign matter as the trolley 16 traverses the distribution duct 10.

Now having described the invention, reference for the scope thereof should be had to the claims that follow in which we claim:

1. A trolley collector for use in a multi-phase distribution system and comprised of a housing and a plurality of collector heads; each of said collector heads being carried by said housing and comprising a casing having end walls and side walls; a notch in each end wall of each collector head casing and extending thereacross from side wall to side wall; said housing including a top wall having slots defining a plurality of openings; each collector head casing being disposed in a respective opening and having transverse play therein in the direction of the dimension between said side walls; the endwise edges of said slots slidably engaging respective casings by protruding into respective notches, wherein the transverse width between side walls of each casing is less than the corresponding dimension of respective slots; and a contactor carried by each casing and extending outwardly thereof.

2. A trolley collector for use in a multi-phase distribution system and comprised of a housing and a plurality of collector heads; each of said collector heads being carried by said housing and comprising a casing having end walls and side walls; a notch in each end wall of each collector head casing, said housing including a top wall having slots defining a plurality of openings; each collector head casing being disposed in a respective opening and having transverse play therein in the direction of the dimension between said side walls; the endwise edges of said slots slidably engaging respective casings by protruding into respective notches, wherein the transverse width between side walls of each casing is less than the corresponding dimension of respective slots; and a contactor carried by each casing and extending outwardly thereof.

3. In a trolley collector as set forth in claim 2, said collector having a pair of guide elements in alignment with said contactor, said contactor being disposed intermediate said guide elements, said guide elements extending in the outward direction of said contactor and being foreshortened with respect thereto and serving to guide said contactor and to clear obstructions in the path thereof.

References Cited in the file of this patent

UNITED STATES PATENTS

| | | |
|---|---|---|
| 1,819,886 | Frank et al. | Aug. 18, 1931 |
| 2,117,480 | Harvey | May 17, 1938 |
| 2,210,171 | Horn | Aug. 6, 1940 |
| 2,358,116 | Wehr | Sept. 12, 1944 |
| 2,436,590 | Moore | Feb. 24, 1948 |